United States Patent
Fitzgerald et al.

(10) Patent No.: US 12,229,146 B2
(45) Date of Patent: *Feb. 18, 2025

(54) SYSTEMS AND METHODS FOR ENHANCED RULES CONFLICT CHECKING WITH DATA VALIDATION

(71) Applicant: State Farm Mutual Automobile Insurance Company, Bloomington, IL (US)

(72) Inventors: Marc L. Fitzgerald, Heyworth, IL (US); Rhonda Mansfield, Mahomet, IL (US); Brett F. Wood, Bloomington, IL (US); Kirsten Wong, Bloomington, IL (US); Rene Ritsema, Downs, IL (US); Kunal Mehra, Bloomington, IL (US); Mark G. Quenette, Bloomington, IL (US); Jason McKee, Normal, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/477,403

(22) Filed: Sep. 28, 2023

(65) Prior Publication Data
US 2024/0020306 A1    Jan. 18, 2024

Related U.S. Application Data

(63) Continuation of application No. 17/079,001, filed on Oct. 23, 2020, now Pat. No. 11,797,541.

(51) Int. Cl.
*G06F 16/2455*    (2019.01)

(52) U.S. Cl.
CPC ............... *G06F 16/24564* (2019.01)

(58) Field of Classification Search
CPC .................................. G06F 16/24564
See application file for complete search history.

(56) References Cited

U.S. PATENT DOCUMENTS

| | | |
|---|---|---|
| 7,210,096 B2 | 4/2007 | Kearney |
| 8,019,795 B2 | 9/2011 | Anderson et al. |
| 8,365,138 B2 | 1/2013 | Iborra et al. |
| 8,401,987 B2 | 3/2013 | Agrawal et al. |
| 8,484,052 B2 | 7/2013 | Rogers et al. |
| 8,494,928 B2 | 7/2013 | Ebling et al. |
| 8,825,695 B2 | 9/2014 | Studer et al. |
| 9,026,679 B1 | 5/2015 | Shmuylovich et al. |
| 9,183,537 B2 | 11/2015 | Yambal et al. |
| 9,460,077 B1 | 10/2016 | Casey |

(Continued)

*Primary Examiner* — Richard L Bowen
*Assistant Examiner* — Aryan D Toughiry
(74) *Attorney, Agent, or Firm* — Armstrong Teasdale LLP

(57) ABSTRACT

A computer system for performing enhanced rules conflict checking is provided. The computer system includes at least one processor in communication with at least one memory device. The at least one processor is programmed to store a plurality of rules for transmitting to a plurality of destination systems and receive a data message for transmission to the plurality of destination systems. The data message is configured to be routed to each of the plurality of destination systems. The at least one processor is programmed to compare the data message to the plurality of rules to validate the data message and if the data message is validated, instruct the requesting system to transmit the data message to the plurality of destination systems.

20 Claims, 11 Drawing Sheets

(56) References Cited

U.S. PATENT DOCUMENTS

| | | |
|---|---|---|
| 9,596,197 B2 | 3/2017 | Faulk |
| 9,626,393 B2 | 4/2017 | Gould et al. |
| 9,672,018 B2 | 6/2017 | Harman et al. |
| 10,198,249 B1 | 2/2019 | Smirnov et al. |
| 10,248,508 B1 | 4/2019 | Park et al. |
| 10,257,041 B2 | 4/2019 | Byard et al. |
| 10,263,847 B2 | 4/2019 | Burk et al. |
| 10,338,901 B2 | 7/2019 | Hernandez-Sherrington et al. |
| 10,489,376 B2 | 11/2019 | Schultz et al. |
| 10,599,635 B1 | 3/2020 | Gunn et al. |
| 10,650,028 B2 | 5/2020 | Collins et al. |
| 10,860,382 B1 | 12/2020 | Sharifi Mehr |
| 10,963,435 B1 | 3/2021 | McAlister et al. |
| 11,151,660 B1 | 10/2021 | Harding et al. |
| 2002/0103835 A1 | 8/2002 | Kearney |
| 2004/0064803 A1 | 4/2004 | Graves et al. |
| 2008/0270340 A1 | 10/2008 | Abrams et al. |
| 2009/0125469 A1 | 5/2009 | McDonald et al. |
| 2011/0022416 A1 | 1/2011 | Bergquist et al. |
| 2011/0185282 A1 | 7/2011 | Mahmood et al. |
| 2011/0209181 A1 | 8/2011 | Gupta et al. |
| 2011/0270807 A1 | 11/2011 | Gomez Maturana et al. |
| 2012/0110077 A1 | 5/2012 | Merchant et al. |
| 2013/0144951 A1 | 6/2013 | Viswanath et al. |
| 2013/0254168 A1 | 9/2013 | Leman |
| 2014/0236953 A1 | 8/2014 | Rapaport et al. |
| 2015/0347540 A1 | 12/2015 | Singh et al. |
| 2016/0070725 A1 | 3/2016 | Marrelli et al. |
| 2016/0078081 A1 | 3/2016 | Damon et al. |
| 2016/0241445 A1 | 8/2016 | Kim |
| 2016/0307195 A1 | 10/2016 | Cantwell et al. |
| 2017/0085661 A1 | 3/2017 | Goldstein et al. |
| 2017/0236060 A1 | 8/2017 | Ignatyev |
| 2017/0324811 A1 | 11/2017 | Boston et al. |
| 2018/0060594 A1 | 3/2018 | Adler et al. |
| 2019/0109824 A1 | 4/2019 | Keini et al. |
| 2019/0123980 A1 | 4/2019 | Singh et al. |
| 2019/0179934 A1 | 6/2019 | Gogineni et al. |
| 2019/0205219 A1 | 7/2019 | Graham et al. |
| 2019/0373031 A1 | 12/2019 | Patel et al. |
| 2019/0385240 A1 | 12/2019 | Lee et al. |
| 2020/0004857 A1 | 1/2020 | Kumar Sethy |
| 2020/0026631 A1 | 1/2020 | Reed et al. |
| 2020/0058023 A1 | 2/2020 | Travizano et al. |
| 2020/0058073 A1 | 2/2020 | Diedrich et al. |
| 2020/0110755 A1 | 4/2020 | Waldman |
| 2020/0125540 A1 | 4/2020 | Thatte et al. |
| 2020/0134482 A1 | 4/2020 | Malik et al. |
| 2020/0241942 A1 | 7/2020 | Crouse et al. |
| 2020/0327097 A1 | 10/2020 | Birka et al. |
| 2020/0335188 A1 | 10/2020 | Ozeran |
| 2020/0341916 A1 | 10/2020 | Subbanna et al. |
| 2020/0389469 A1 | 12/2020 | Litichever et al. |
| 2020/0396310 A1 | 12/2020 | Soni et al. |
| 2021/0081848 A1 | 3/2021 | Polleri et al. |
| 2021/0125106 A1 | 4/2021 | Okamoto |
| 2021/0334902 A1 | 10/2021 | Craig et al. |
| 2022/0083532 A1 | 3/2022 | Solari |
| 2022/0122075 A1 | 4/2022 | Bardouille et al. |
| 2022/0417002 A1 | 12/2022 | Esiner et al. |

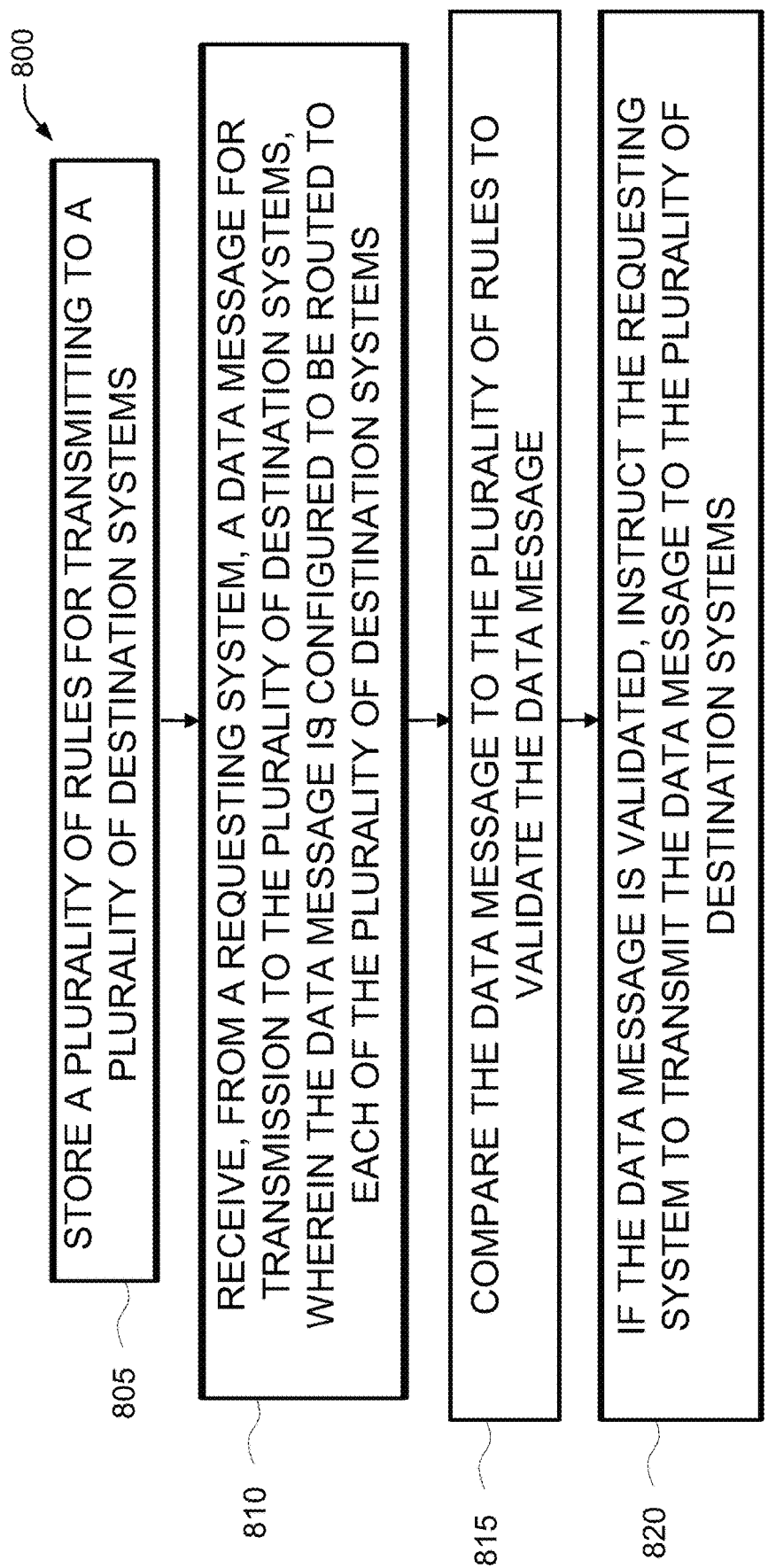

SYSTEMS AND METHODS FOR ENHANCED RULES CONFLICT CHECKING WITH DATA VALIDATION

CROSS-REFERENCE TO RELATED APPLICATIONS

This application is a continuation of U.S. patent application Ser. No. 17/079,001, filed Oct. 23, 2020, the entire contents and disclosure of which are hereby incorporated by reference herein in their entirety.

BACKGROUND

The field of the invention relates generally to data validation, and more specifically to system and methods for providing enhanced rules conflict check with data validation.

In many cases, computer devices provide requested or required information to other computer system or applications. Each of these applications may require the different data or that the data is required to be in a specific format. When a computer device, such as one associated with a database, had to provide data to multiple different systems, the different systems may require the data in different formats, or require different data to be provided for similar requests. Inconsistent data validations can allow undetected data errors to be transmitted to other computer systems, where the data errors can negatively impact the other computer systems. In some situations, the data injection point may be unknown or difficult to find. This increases the difficulty of and the time to find the point where the error is introduced and fix the error. This can also increase the complexity of fixing the error as multiple computer systems or applications may rely on the data associated with the data error. Accordingly, it would be advantageous ensure that the data is properly formatted and provided for each requesting system or application.

BRIEF DESCRIPTION

The present embodiments may relate to systems and methods for performing enhanced rules conflict checking. A data integrity and validation (DIV) system, as described herein, may include a data integrity and validation ("DIV") computer device. The DIV computer device may be configured to i) store a plurality of rules for transmitting to a plurality of destination systems, wherein the plurality of destination systems includes a first destination system and a second destination system; ii) receive, from a requesting system, a data message for transmission to the plurality of destination systems, wherein the data message is configured to be routed to each of the plurality of destination systems, wherein the data message includes a first plurality of fields for the first destination system and a second plurality of fields for the second destination system, wherein the data message is assembled by the requesting system from a source database based on a predetermined data format including a plurality of fields to be populated from the source database; iii) compare the data message to the plurality of rules to validate the data message; iv) if the data message is validated, instruct the requesting system to transmit the data message to the plurality of destination systems; v) determine one or more validation errors based on the comparison; vi) determine whether or not to validate the data message based on the one or more validation errors, wherein the one or more validation errors include at least one of missing data, incorrect data, improperly formatted data, and failed conditional logic; vii) determine an error level for each validation error of the one or more validation errors, wherein the error level includes at least one of a low level and a high level; viii) validate the data message if none of the one or more validation errors includes a high level; ix) indicate that the validation failed if at least one validation error of the one or more validation errors includes a high level; x) request a user input in response to a validation error including a high level; xi) adjust the data message to correct at least one validation error of the one or more validation errors; xii) store the one or more validation errors for further review; xiii) receive a first plurality of rules from the first destination system; xiv) receive a second plurality of rules from the second destination system; xv) compare the first plurality of rules to the second plurality of rules; xvi) generate the plurality of rules based on the comparison; xvii) detect a first conflict between the first plurality of rules and the second plurality of rules associated with a first data field; xviii) generate a format for the data message to include a first version of a first data field for the first destination system and a second version of the first data field for the second destination system; xix) retrieve a data value from the source database; xx) convert the data value from a first format to a second format; xxi) populate a data field of the data message with the converted data value; xxii) retrieve a data value from the source database; xxiii) populate a first data field of the data message with the data value, wherein the first data field is associated with a first destination system of the plurality of destination systems; xxiv) convert the data value from a first format to a second format; and xxv) populate a second data field of the data message with the converted data value, wherein the second data field is associated with a second destination system of the plurality of destination systems.

At least one advantage of this system is that because the data is validated prior to being transmitted to and ingested by destination systems. This system validates requirements from producer and consumers concurrently. This provides transparent data validation requirements to all data producers and consumers by performing point-in-time evaluation for data quality, content, and condition. The system also provides an externalized validation system to the calling application which allows configurability on invocation. This system also provides a dashboard view and error logging provides holistic view of data quality.

In one aspect, a computer system for performing enhanced rules conflict checking may be provided. The computer system includes at least one processor in communication with at least one memory device. The at least one processor is programmed to store a plurality of rules for transmitting to a plurality of destination systems and receive, from a requesting system, a data message for transmission to the plurality of destination systems. The data message is configured to be routed to each of the plurality of destination systems. The at least one processor is also programmed to compare the data message to the plurality of rules to validate the data message and if the data message is validated, instruct the requesting system to transmit the data message to the plurality of destination systems. The computer system may have additional, less, or alternate functionality, including that discussed elsewhere herein.

In another aspect, a computer-based method for performing enhanced rules conflict checking may be provided. The method may be implemented a computer system including at least one processor in communication with at least one memory device. The method includes storing, in the at least one memory device, a plurality of rules for transmitting to a plurality of destination systems and receiving, from a requesting system, a data message for transmission to the plurality of destination systems. The data message is configured to be routed to each of the plurality of destination systems. The method also includes comparing the data message to the plurality of rules to validate the data message and if the data message is validated, instructing the requesting system to transmit the data message to the plurality of destination systems. The method may include additional, less, or alternate actions, including those discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 8 illustrates a process for performing data validation and integrity checks using at least one of the system shown in FIG. 1, the system shown in FIG. 2, and the system shown in FIG. 4.

Figure 1:
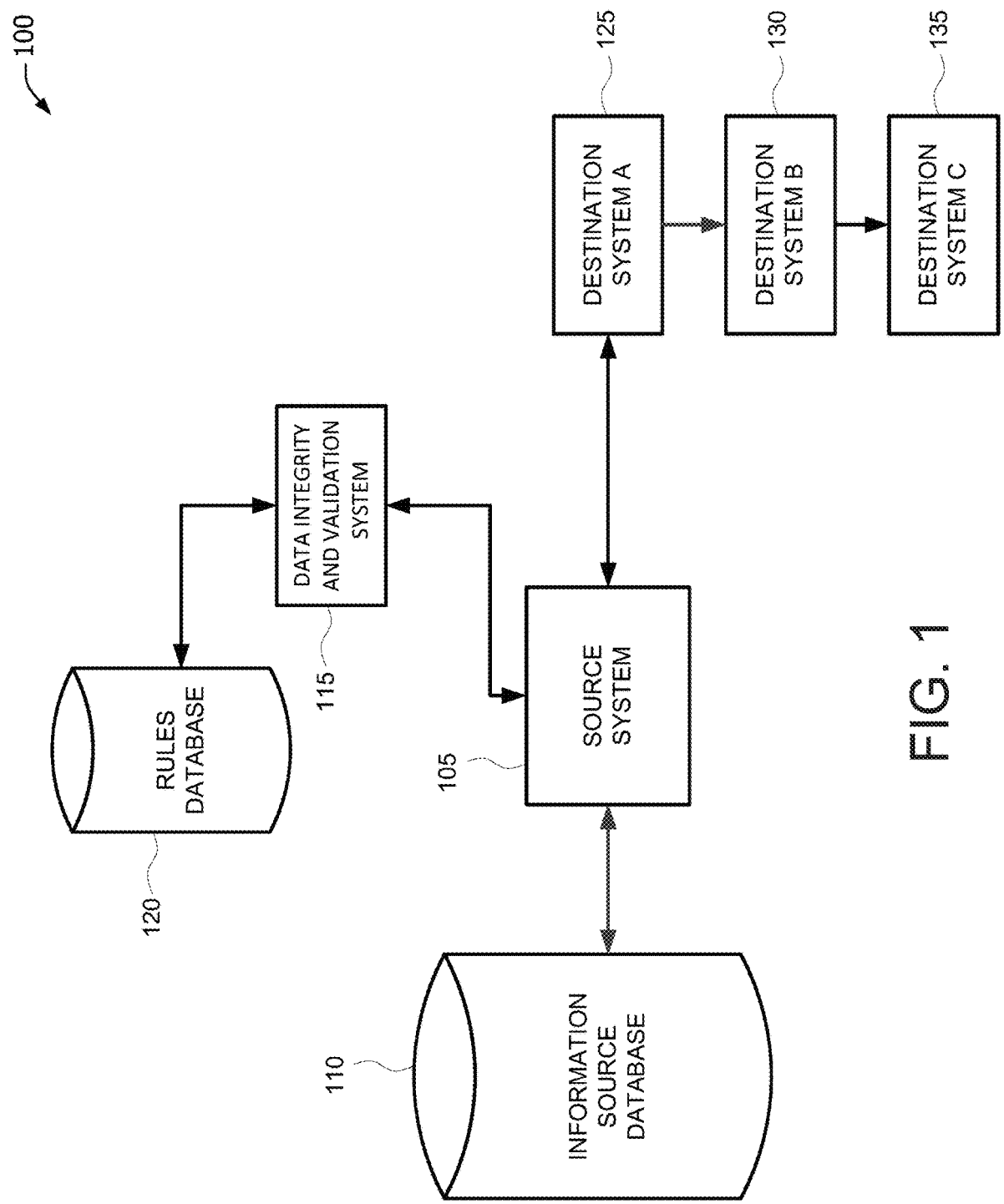
FIG. 1 illustrates an exemplary system for data validation and integrity checks in accordance with at least one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE INVENTION

The present embodiments may relate to, inter alia, systems and methods for providing enhanced rules conflict checks with data validation for downstream systems. In an exemplary embodiment, the process is performed by a data integrity and validation ("DIV") computer device, also known as a data integrity and validation ("DIV") server.

The DIV computer device interacts with a database or data structure that provides data to a data flow pipeline. The DIV computer device is programmed to provide data to one or more destination systems. The DIV computer device is also programmed to identify data anomalies to allow the user to take corrective measures before the data anomalies are introduced to the destination systems or to notify the user that non-critical data anomalies. Data anomalies include where the data in a data message conflicts with the rules for that data message. Data anomalies can include, but are not limited to, missing data, incorrect data, improperly formatted data, data in the wrong place, and other errors that could impact other systems.

The DIV computer device is configured to evaluate the valuation requirements from the data producers and the data consumers (i.e., the destination systems) to determine if the data is in the proper format and location in data messages to be transmitted to the destination systems. By consolidating the data validation and data consumption rules for a plurality of destination computer systems, the DIV computer device is able to concurrently execute data validation for multiple systems, provide point-in-time evaluation for data quality, content, and condition, provide analysis of data structures across time periods, provide data validation externalized from the calling application or system, and provide dashboard and error logging analysis for an overall view of the quality of the data being provided.

The DIV system is also programmed to assist with determining the format of a data message based on the rules and requirements of the destination systems that the data message is to be routed to. The DIV system receives the rules and requirements from each of the destination systems that a data message is to be routed to. The DIV system compares the rules and requirements to each other to determine the final rules and requirements for the data message. The DIV system also determines the layout of the payload of the data message so that all of the required fields and the required formats at included in the data message. The DIV system instructs the destination systems in which fields each destination system's data fields are stored. When the destination system receives the data message, the destination system knows which fields to extract the data from.

FIG. 1 illustrates an exemplary system 100 for data validation and integrity checks in accordance with at least one embodiment. In system 100, a source system 105 is in communication with an information source database 110. The source system 105 is also in communication with a data integrity and validation (DIV) system 115, which is associated with a rules database 120. The source system 105 is further in communication with one or more destination systems 125-135.

The destination systems A-C 125-135 represent multiple systems that request information from the information source database 110. In system 100, the three destination systems A-C 125-135 are in communication in a serial order, where a data message is transmitted from the source system 105 to destination system A 125. In some embodiments, destination systems A-C 125-135 are independent of each other. In other embodiments, destination systems A-C 125-135 are related. For the discussion here, destination system C 135 is considered to be 'downstream' of destination system B 130, which is 'downstream' of destination system A 125. While only three destination systems 125-135 are shown in the Figures presented herein, the systems and methods described herein may be used for any number of destination systems 125-135.

The data message is then transmitted from destination system A 125 to destination system B 130 and then from destination system B 130 to destination system C. When the data message reaches each destination system 125-135, the corresponding destination system 125-135 retrieves the data that it requires from the data message and ignores the data in the rest of the fields. The data message needs to include the required information for each of the destination systems 125-135 that the data message will be routed to. For example, if the data message is being routed to destination system A 125, then destination system B 130, and finally destination system C 135, the data message will include all of the data required by each destination system 125-135. This also requires the data message to conform to the rules and requirements for each of the destination systems 125-135.

Some of the data fields may have contradictory requirements for different destination systems 125-135. For example, destination system A 125 may require the date to be in the American format of month, day, and year, but destination system B 130 may require the data to be in the European format of day, month, and year. Or destination system B 130 may require the year to be two digits long, while destination system C 125 may require the year to be four digits long. Or the state could be required to be spelled out instead of using the two letter code. Or the zip code may require five digits or nine digits. The same data in a data field could be required to be 8 bits long for destination system A 125 and 12 bits long for destination system B 130. In some embodiments, this is resolved by having two different data fields in the data message, one field including the information for destination system A 125 and the other field including the information for destination system B 130.

In the exemplary embodiment, the source system 105 is a data source computer device that receives requests for data and generates data messages to respond with. The source system 105 transmits the requested data to one or more of the destination systems 125-135 in the appropriate data message. The source system 100 can transmit a data message in response to a received data request from one or more destination systems 125-135. The source system 100 can also transmit a data message at a predetermined time or after a predetermined period of time. The source system can further receive a request to transmit the data to the destination systems 125-135 from an outside system, such as when specific data is received in the information source database 110.

The data message can include, but is not limited to, a header field, a message type field, one or more destination fields, a length field, and a payload. The payload includes a plurality of data fields populated from the information source database 110. As described further below, the length field and the data fields in the payload of each data message depend on the message type and the destination systems 125-135 that the data message is being transmitted to.

The information source database 110 is configured to store information, such as, but not limited to, client records, property records, driving records, financial records, insurance policy information, cybersecurity information, and/or any other type of data required. The source system 105 is programmed to provide the information in the information source database 110 to the destination systems 125-135. In some embodiments, the records in the information source database 110 are formatted based on how the information is to be presented to the destination systems 125-135. For example, the records in the information source database 110 are formatted so that the information can be directly added to the message providing the information to the destination systems 125-135. In one example, a date is formatted in the European style, where the number for the date is before the month. In other embodiments, the source system 105 converts or formats the information prior to adding the information to the data message to the one or more of destination systems 125-135 based on the requirements of the receiving destination systems 125-135. The data in the information source database 110 can be provided from a plurality of different computer systems. In some embodiments, the data is provided to the source system 105, which stores the data in the information source database 110. In other embodiments, other computer systems store the data in the information source database 110. While the other computer systems may validate the information as it is being provided, the DIV system 115, described below, also validates the data in the information source database 110 to ensure that the data is placed into the data message correctly.

The DIV system 115 is programmed to receive the data message for validation before the data message is transmitted to the destination systems 125-135. The DIV system 115 is in communication with rules database 120. The rules database 120 includes the rules associated with the destination systems 125-135 about how those destination systems 125-135 expect to receive the data stored in the information source database 110. The DIV system 115 compares the data message to the rules in the rules database 120 to validate the data message. If the data message is validated, then the DIV system 115 notifies the source system 105 of the validation. The source system 105 can then transmit the data message to the destination systems 125-135. If the data message is not validated, then the DIV system 115 determines why the data message was not validated. If the DIV system 115 determines that the validation issue is minor, the DIV system 115 can log the validation issue and instruct the source system 105 to transmit the data message to the destination systems 125-135. If the DIV system determines that the validation issue is significant, then the DIV system 115 can log the validation issue and then notify the user of the validation issue. In some embodiments, the user can then correct the validation issue to allow the data message to be transmitted. In some further embodiments, the DIV system 115 corrects the validation issue in the data message and transmits the corrected data message to the source system 105 to be transmitted to the destination systems 125-135.

In some embodiments, a minor (or low) validation error may include data that is not vital to the operation of system 100. A minor validation error may also be considered a low risk error, where the validation failure presents an acceptable risk, but the error should be further investigated and repaired at a later time. For example, data for trend analysis may be missing. As the trend analysis only occurs on a periodic basis, the validation error can be considered minor as the rest of the system 100 will continue to operate effectively. Furthermore, since the error is logged, those performing trend analysis could be aware of the issue before they begin performance of the analysis and thus have time to correct the issue. An example of a significant (or high level) validation error may include missing data that is vital to the operation of the system 100, such as, but not limited to, financial data. A significant validation error may also be considered a high risk error, where the validation failure presents an unacceptable risk and could critically impact the destination systems 125-135, where data correction is required before the data message is released. If this data is missing or incorrect, then one or more of the downstream systems 125-135 may operate inefficiently or may introduce errors into the system 100. Accordingly, significant or high level validation errors are logged and the associated data message is not transmitted. In some embodiments, the low risk issues could be considered at a warning level, while the high risk issues are at an error level.

In validating the data message, the DIV system 115 can evaluate a plurality of rules to ensure that each of the plurality of rules is being followed for the data message, so that the data message will not cause any problems with the destination systems 125-135. Example rules can include, but are not limited to, i) quality rules (i.e. is the data present? does the data element meet the expected requirements for format and length?); ii) content rules (i.e. allowed values); iii) conditional rules (i.e. evaluation of secondary elements for quality and/or content based on the presence or content of primary elements); and/or any other types of rules.

Examples of quality rules include, but are not limited to, ensuring that the birthday field is filled, ensuring that the date is formatted correctly (i.e. two digits in each of the month, day, and year fields), and ensuring that the proper field type is used (i.e. Boolean, text, integer, etc.). Examples of content rules include, but are not limited to, ensuring that the provided date is proper (i.e. no greater than 28 days in February 1990). Examples of conditional rules include, but are not limited to (i.e. if field A is filled, then field B needs to be filled; if field A is set to 8, then field B needs to be filled; or if a policy states that it is for two people, but there in only information for one person). Other rules may be used based on the requirements of different destination systems 125-135.

In some embodiments, DIV system 115 has access to the information source database 110 to check if the correct information was placed into the fields of the data message. For example, the DIV system 115 can compare the fields of the data message to the raw data in the information source database 110 and determine that the source system 105 improperly converted the data prior to placing the data in the data message. In some further embodiments, the DIV system 115 logs the improper conversion issue to be repaired. In some embodiments, the destination system 125-135 provides preferences on how to handle issues and errors. For example, the destination system 125-135 may instruct the source system 105 to transmit the data message even if there are specific types of errors or errors in specific fields of the data message. In still further embodiments, the DIV system 115 repairs the improperly converted field so that the data message can still be transmitted to the destination systems 125-135.

The rules database 120 stores a plurality of rules based on the rules of each of destination systems 125-135. The rules in the rules database 120 describe many or all of the fields in the data message including, but not limited to, what information should be included in each field, when, and in what format.

In some embodiments, the DIV system 115 transmits a validation success or failure notification to the source system 105 after analyzing the data message. In other embodiments, the DIV system 115 transmits the data message to the destination system(s) 125-135, after analyzing the data message. The validation notification can include information about all of the low risk and high risk issues that were detected by the DIV system 115.

Figure 2:
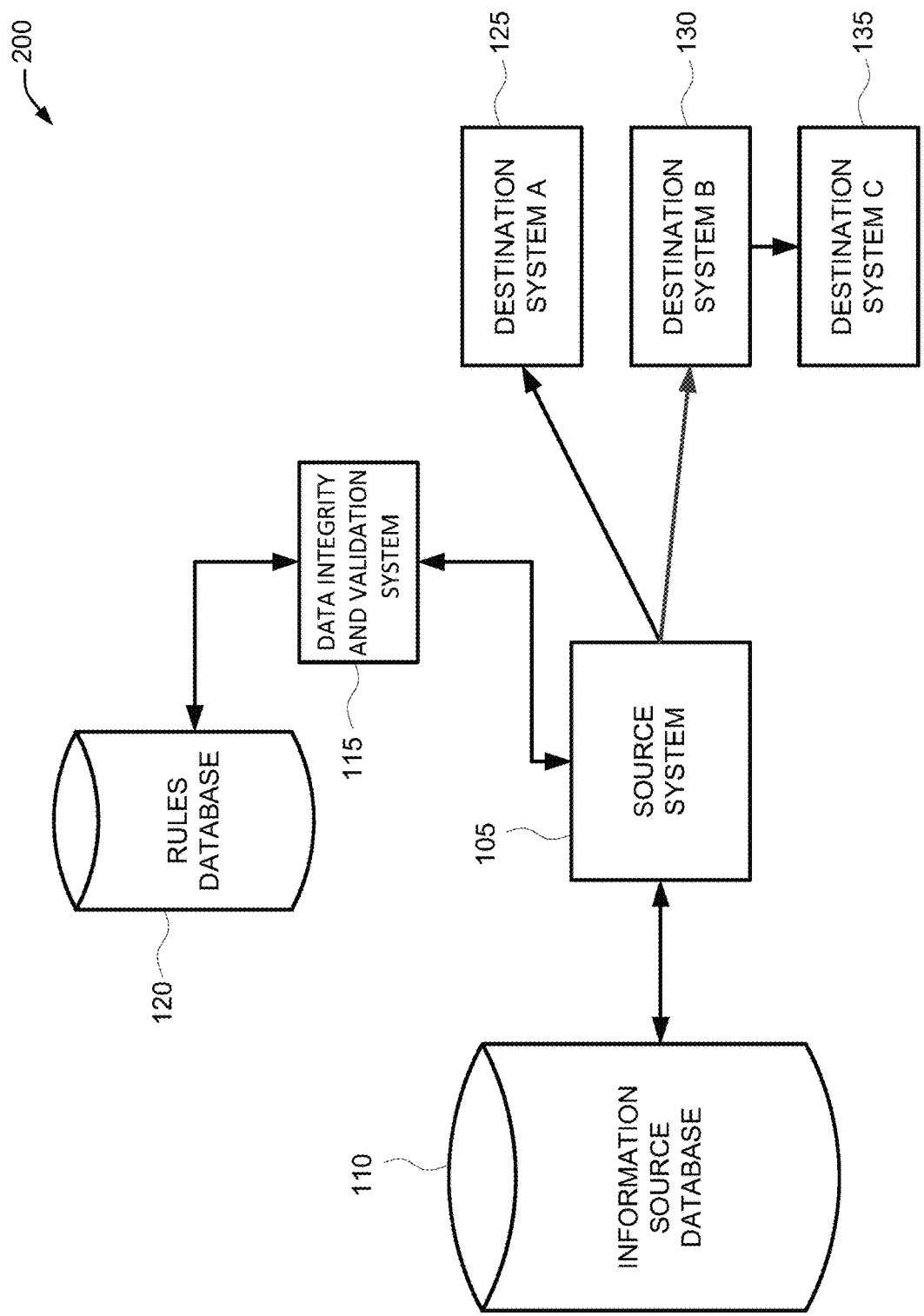
FIG. 2 illustrates another exemplary system for data validation and integrity checks in accordance with at least one embodiment.

FIG. 2 illustrates another exemplary system 200 for data validation and integrity checks in accordance with at least one embodiment. In system 200, destination systems A 125 and B 130 are in parallel with each other, while destination system C 135 is downstream of destination system B 130. When a data message is transmitted to destination system B 130, the data message must comply with the rules of destination system B 130 and destination system C 135. In some embodiments, the same data message is transmitted to destination system A 125 and destination system B 130 simultaneously and must comply with the rules for both. In other embodiments, different data messages are sent to destination system A 125 and destination system B 130. Thus the different data messages only have to comply with the rules of any destination systems 125-135 that the data message is routed to.

In other embodiments, other configurations of destination systems 125-135 may be used with the systems and methods described herein. Furthermore, in at least one embodiment, destination system A 125 may provide information for destination system C 135. For example, a data field in the payload may be empty when the data message is transmitted from source system 105 to destination system A 125. Destination system A 125 can then fill in the appropriate data into the data field of the data message, so that destination system C 135 can receive that data. In this example, destination system A 125 may be a pricing system and determines and provides a price for destination system C 135 to use.

Figure 3:
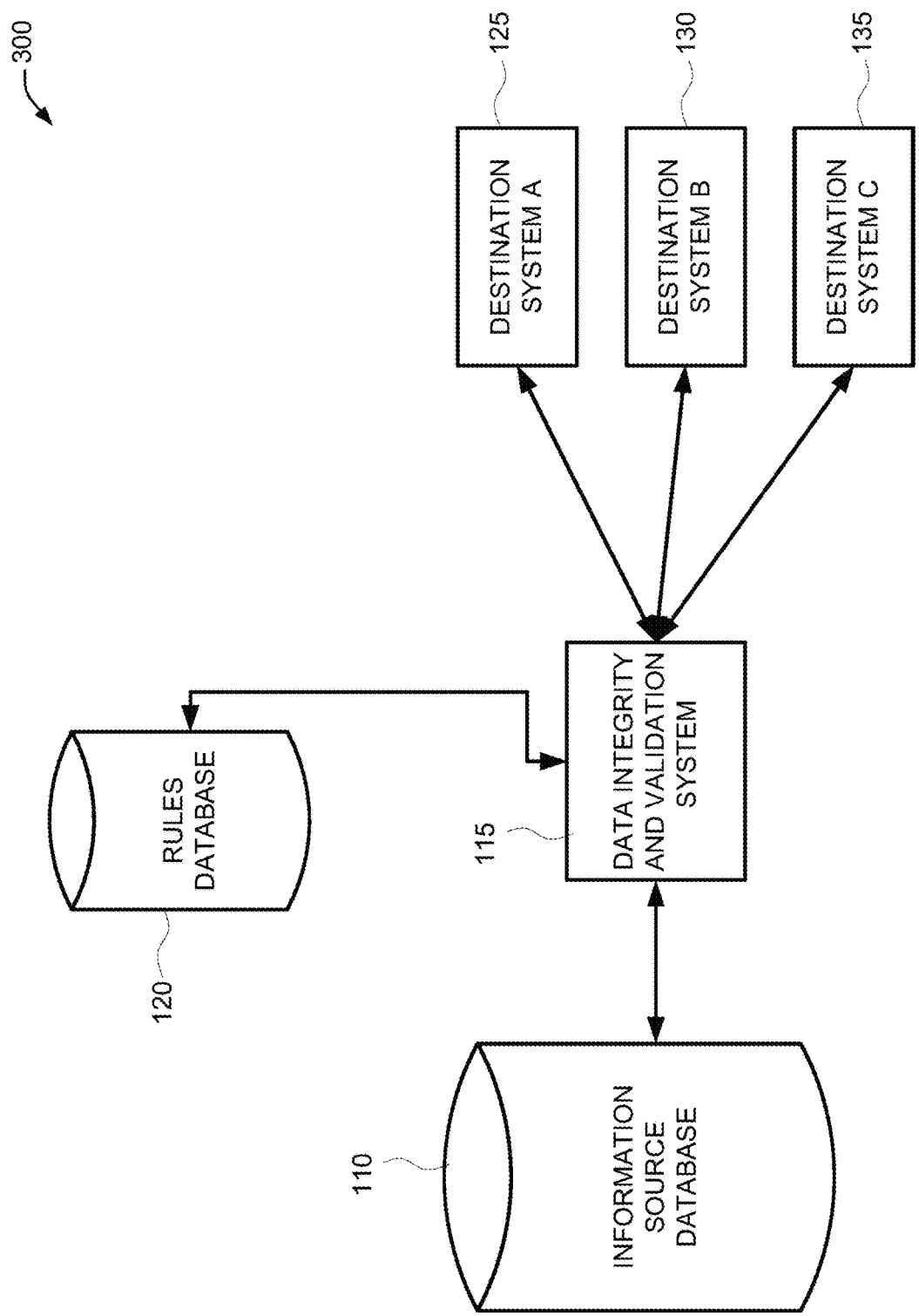
FIG. 3 illustrates an exemplary system for compiling rules for making data validation and integrity checks using the system shown in FIG. 1.

FIG. 3 illustrates an exemplary system 300 for compiling rules for making data validation and integrity checks using the system 100 (shown in FIG. 1).

In system 300, the DIV system 115 is in communication with a plurality of destination systems 125-135. The DIV system 115 receives a plurality of rules from each of the destination systems 125-135. The DIV system 115 analyzes the plurality of rules to determine if there are any rules conflicts. Conflicts can include, but are not limited to, rules requiring data to be in different formats for different destination systems 125-135, missing data, different versions of the effectively the same data (birthdate vs. current age), and contradictory data.

The DIV system 115 is also in communication with the information source database 110. In some embodiments, the DIV system 115 compares the plurality of rules to the data stored in the information source database 110. The DIV system 115 also determines if there are any rules conflicts between the plurality of rules and the information stored in the information source database 110. For example, a date may be stored in European format vs. American format; the birthdate may be stored, but not the current age; or the number of digits required for the year may vary. For both of these examples, the DIV system 115 can instruct the source system 105 to properly format the required data as the source system 105 generates the data message.

The DIV system 115 compares the plurality of rules from each of the destination systems 125-135 and the available data in the information source database 110 and generates a blueprint for the data message. The DIV system 115 determines which fields and field types will be put in the payload section, where those fields will be located in the data message, and how those fields will be formatted. The DIV system 115 also informs the destination systems 125-135 where the data that each of the destination systems 125-135 needs will be located in the data message.

For example, the three fields for destination system A 125 are fields 1, 2, and 3. The three fields for destination system B 130 are fields 1, 2, and 4. And the four fields for destination system C 135 are fields 1, 2, 3, and 5. The DIV system 115 ensures that the data message includes all of the required fields in the required formats. In this example, field 3 could be the date of activation of a policy in the American date format. Destination systems A 125 and C 135 require the date field in the American date format. However, destination system B 130 requires the date field in the European date format. Since destination system B 130 receives the same data message as destination systems A 125 and C 135, the DIV system 115 generates the data message to store the date in the American format in field 3 and in the European format in field 4. While this adds an additional field to the data message, it reduces the number of messages required to be generated and sent over the network, thus reducing overall network traffic.

In some other embodiments, the fields of the data message are predetermined, where the DIV system 115 does not have access to the information source database 110. In these embodiments, the data message is designed to fit the requirements of each of the destination systems 125-135. Then when another destination system is added at a subsequent point in time, such as destination system D (not shown), the DIV system 115 receives the requirements of destination system D and compares those requirements to the data message. If the requirements are compatible, then no other actions are required and destination system D is integrated into the system 100. If there are issues or conflicts, then the DIV system 115 can notify one or more administrator users to fix the conflicts. In further embodiments, the DIV system 115 can edit the data message and inform destination system D where the fields that it needs to access are located in the data message.

Figure 4:
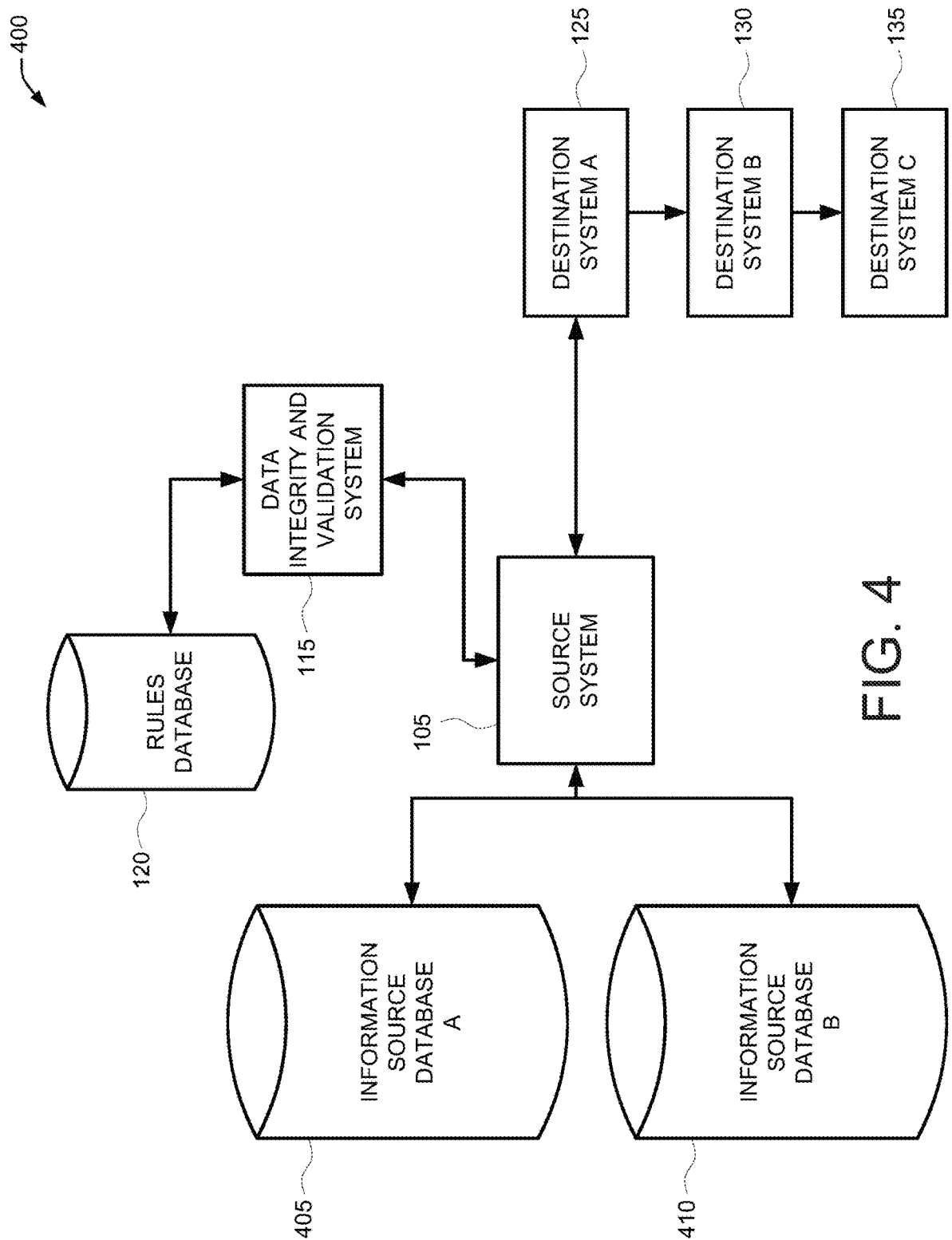
FIG. 4 illustrates another exemplary system for compiling rules for making data validation and integrity checks using the system shown in FIG. 2.

FIG. 4 illustrates a further system 400 for data validation and integrity checks in accordance with at least one embodiment. In system 400, source system 105 has access to two information source databases 110, information source database A 405 and information source database B 410. In some embodiments, each database 405-410 provides different information and is associated with different data messages.

In system 400, the source system 105 routes the appropriate information from the appropriate information source database 405-410 to the appropriate destination system(s) 125-135. For example, source system 105 is responsible four separate data messages. The first data message includes data from information source database A 405 and is transmitted to destination systems A 125 and B 130. The DIV system 115 receives the rules requirements from destination systems A 125 and B 130 for the first data message. The DIV system 115 generates the first data message in response to the received rules sets and the information available in information source database A 405. When source system 105 receives a request for the first data message, the source system 105 populates the first data message with the appropriate data from information source A 405. Then source system 105 requests that the DIV system 115 validate the populated first data message. The DIV system 115 uses the rules sets from destination system A 125 and destination system B 130 to validate the first data message. If the first data message is validated, the source system 105 transmits the first data message to destination system A 125.

The second data message includes data from information source database A 405 and is transmitted to destination systems A 125, B 130, and C 135. The DIV system 115 receives the rules requirements from destination systems A 125, B 130, and C 135 for the first data message. The DIV system 115 generates the second data message in response to the received rules sets and the information available in information source database A 405. The second data message can include more fields than the first data message, which may include additional data requested by destination system C 135 and/or additional fields needed to resolve conflicts between the rules for destination systems A 125 or B 130 and destination system C 135.

When source system 105 receives a request for the second data message, the source system 105 populates the second data message with the appropriate data from information source A 405. Then source system 105 requests that the DIV system 115 validate the populated second data message. The DIV system 115 uses the rules sets from destination system A 125, B 130, and C 135 to validate the second data message. If the second data message is validated, the source system 105 transmits the second data message to destination system A 125.

The third data message includes data from information source database B 410 and is transmitted to destination systems A 125 and C 135. The DIV system 115 receives the rules requirements from destination systems A 125 and C 135 for the third data message. The DIV system 115 generates the third data message in response to the received rules sets and the information available in information source database B 410. When source system 105 receives a request for the third data message, the source system 105 populates the third data message with the appropriate data from information source B 410. Then source system 105 requests that the DIV system 115 validate the populated third data message. The DIV system 115 uses the rules sets from destination system A 125 and destination system C 135 to validate the third data message. If the third data message is validated, the source system 105 transmits the third data message to destination system A 125.

The fourth data message includes data from information source database B 410 and is transmitted to destination systems B 130 and C 135. The DIV system 115 receives the rules requirements from destination systems B 130 and C 135 for the third data message. The DIV system 115 generates the third data message in response to the received rules sets and the information available in information source database B 410. When source system 105 receives a request for the fourth data message, the source system 105 populates the fourth data message with the appropriate data from information source B 410. Then source system 105 requests that the DIV system 115 validate the populated fourth data message. The DIV system 115 uses the rules sets from destination system B 130 and destination system C 135 to validate the fourth data message. If the fourth data message is validated, the source system 105 transmits the fourth data message to destination system B 130.

Figure 5:
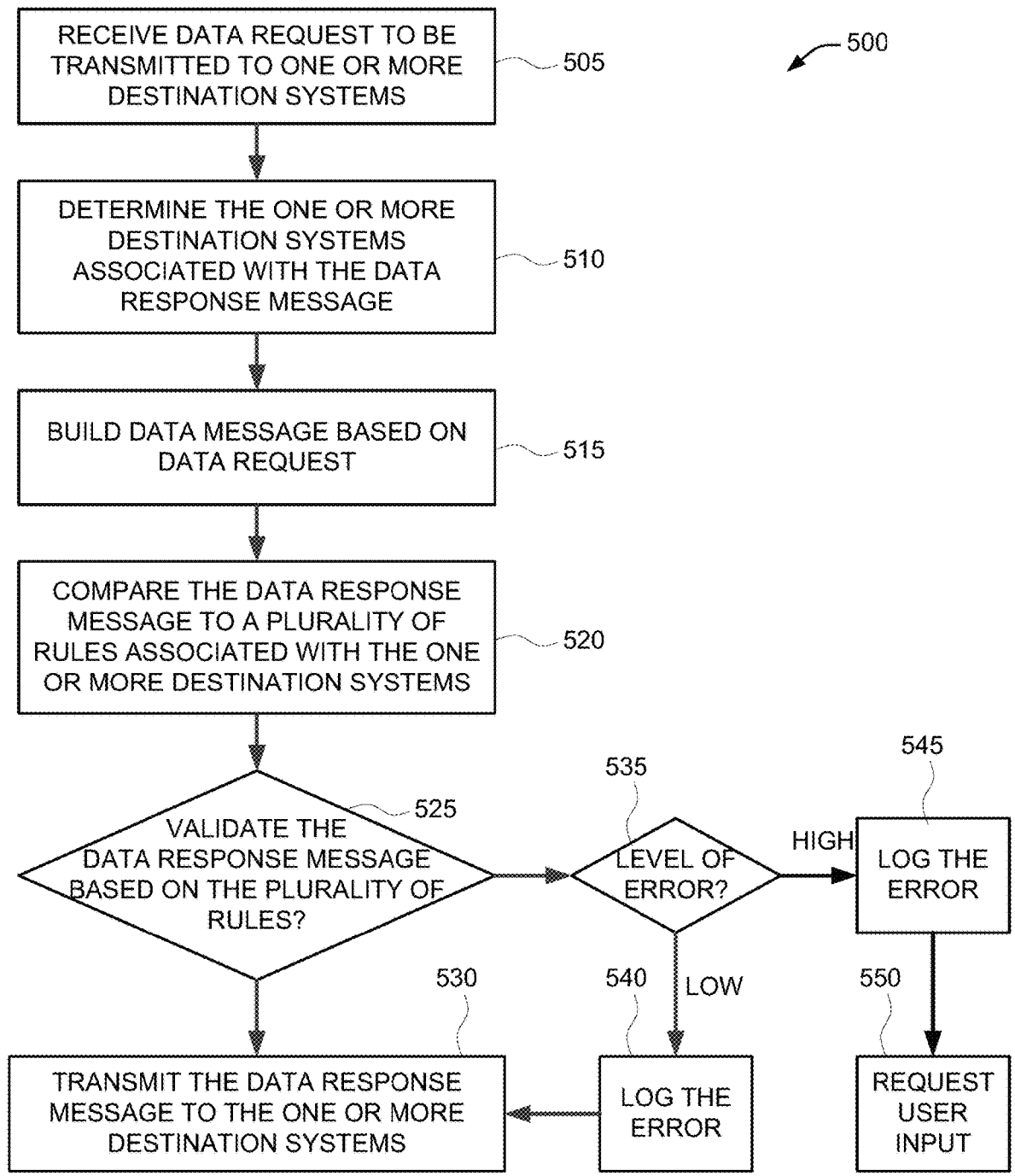
FIG. 5 illustrates a process for performing data validation and integrity checks using at least one of the system shown in FIG. 1, the system shown in FIG. 2, and the system shown in FIG. 4.

FIG. 5 illustrates a process 500 for performing data validation and integrity checks using at least one of the system 100 (shown in FIG. 1), the system 200 (shown in FIG. 2), and the system 400 (shown in FIG. 4). In the exemplary embodiment, process 500 is performed by the source system 105 and the DIV system 115 (both shown in FIG. 1).

The source system 105 receives 505 a data request to be transmitted to one or more destination system 125-135 (shown in FIG. 1). In some embodiments, the data request could originate from one or more of the destination systems 125-135. In other embodiments, the data request could be automated, where the data request or the data message is transmitted on a regular basis. In other embodiments, the data request could originate from a user computer device, such as a user computer device being used by a user to input information.

The source system 105 determines which data message to respond with. The data message selected may be based on one or more of the destination systems 125-135 receiving the data message, the information source database 110 (shown in FIG. 1) containing the data, and/or the data request message.

The source system 105 determines 510 one or more destination systems 125-135 to transmit the data message from the data request. As described above, the source system 105 can store a plurality of data messages that can be routed to different destination systems 125-135. In at least one embodiment, each data message is routed to a specific set of destination systems 125-135 due to the required fields from the requirements of the associated destination systems 125-135. By determining 510 the destination systems, the source system 105 also can determine the appropriate data message to transmit to those destination systems 125-135.

The source system 105 builds 515 the data message based on the data request. In the exemplary embodiment, the format and fields of the data message have been previously determined, such as in process 600 (shown in FIG. 6). The source system 105 populates the fields of the data message with the data from the information source database 110. In some embodiments, the source system 105 converts some of the data from the information source database 110 to a required format prior to populating that data in the appropriate data field. For example, if the field requires that the year be listed in two digits and the information source database 110 stores the year using four digits, the source system 105 converts the year field from four to two digits for the data message. Or if the data field requires the age of the client, but only the birthdate is stored in the information source database 110, the source system 105 determines the age of the client from the birthdate and the current date.

The DIV system 115 compares 520 the data message to a plurality of rules associated with the determined one or more destination systems 125-135. In some embodiments, the source system 105 calls the DIV system 115 to validate the data message. In other embodiments, the source system 105 transmits the data message to the DIV system 115.

The DIV system 115 validates 525 the data message based on the plurality of rules stored in the rules database 120 (shown in FIG. 1). In some embodiments, the rules database 120 stores the rules for each destination system 125-135. In other embodiments, the rules database 120 stores the rules for each data message, where the rules for each destination system 125-135 that the data message is scheduled to go to has been integrated together and stored in the rules database 120, such as in process 600.

If the data message is validated, the data message is transmitted 530 to the one or more destination systems 125-135. In some embodiments, the source system 105 transmits 530 the data message. In other embodiments, the DIV system 115 transmits 530 the data message.

If the data message is not validated, the DIV system 115 determines 535 the level of error associated with the validation failure. If the level of error is low (or minor), the DIV system 115 logs 540 and the data message is transmitted 530 to the one or more destination systems 125-135. If the error level is high (or significant), the DIV system 115 logs 545 the error and requests 550 user input. While the error system described herein as high level and low level errors, in some embodiments, other error valuation systems, such as colors or a scale may be used with the systems described herein.

In some embodiments, the user is in the process of inputting data, such as through the source system 105. The user may be entering data to request a policy or policy update. The DIV system 115 determines that one or more fields in the data message are missing or are incorrectly formatted. In these embodiments, the DIV system 115 may inform the source system 105 of the error and the source system 105 may request corrected information from the user. The user input may correct the error, so that the data message may then be transmitted 530.

In some other embodiments, the user is an administrator that makes one or more changes to at least one of the data message and the information source database 110 for future data messages to correct the error.

In the exemplary embodiment, the DIV system 115 compares 520 the entire data message to the rules associated with that data message. Then the DIV system 115 compiles all of the issues and errors for the data message.

In some embodiments, the destination system 125-135 provides preferences on how to handle issues and errors. For example, the destination system 125-135 may instruct the source system 105 to transmit 530 the data message even if there are specific types of errors or errors in specific fields of the data message. In other embodiments, the source system 105 transmits information about the issues and errors to the destination system(s) 125-135 associated with the error or issue and request instructions on how to proceed. The corresponding destination system(s) 125-135 instructs the DIV system 115 and/or the source system 105 whether to transmit 530 the data message, fix the issue or error, or prevent transmission of the data message.

If there are multiple errors, then each error is logged 540-545. If all of the errors are low, then the data message is transmitted 530.

In some embodiments, the DIV system 115 corrects the error.

Figure 6:
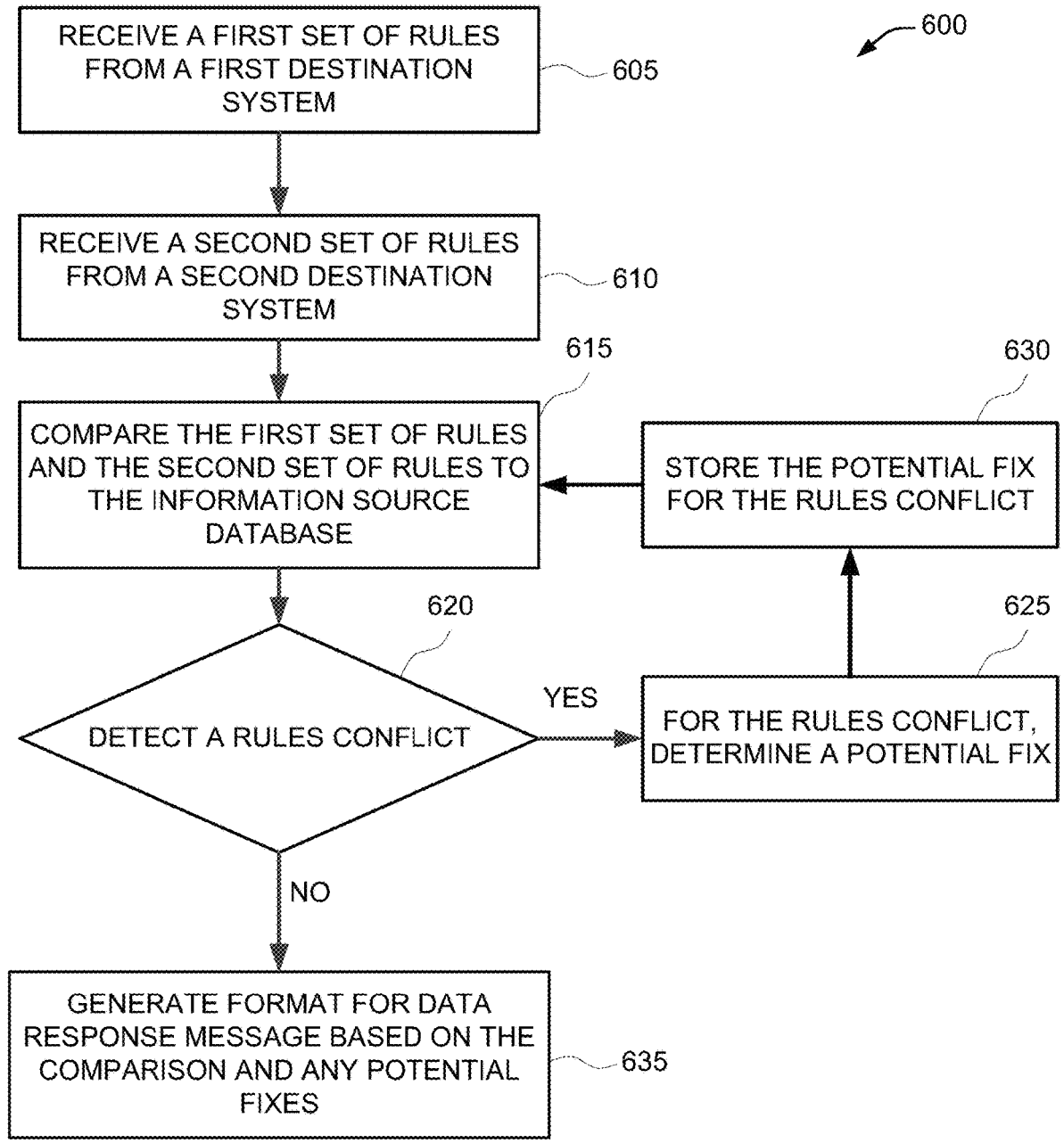
FIG. 6 illustrates a process for compiling rules for making data validation and integrity checks using the system shown in FIG. 3.

FIG. 6 illustrates a process 600 for compiling rules for making data validation and integrity checks using the system 300 (shown in FIG. 3). In the exemplary embodiment, process 600 is performed by the DIV system 115 (shown in FIG. 1). Process 600 can be used when a new data message is being designed. For the new data message the destination systems 125-135 that the message will be transmitted to are analyzed for their rules to determine if there any conflicts in the fields of the data message. The rules describe the data requirements of the destination systems 125-135 that the data message will be transmitted to, including i) quality rules (i.e. is the data present? does the data element meet the expected requirements for format and length?); ii) content rules (i.e. allowed values); iii) conditional rules (i.e. evaluation of secondary elements for quality and/or content based on the presence or content of primary elements); and/or any other types of rules necessary. The data message is designed so that each destination system 125-135 will know where in the data message its fields are stored.

The DIV system 115 receives 605 a first set of rules from a first destination system, such as destination system A 125 (shown in FIG. 1). The DIV system 115 receives 610 a second set of rules from a second destination system, such as destination system B 130. While only two sets of rules are described in process 600, multiple sets of rules may be used to create the data message, these can include, but are not limited to, rules from the destination systems 125-135, rules from the information source database 110 (shown in FIG. 1), and rules for the data message itself.

The DIV system 115 compares 615 the first set of rules and the second set of rules. In some embodiments, the DIV system 115 compares 615 the rules to each other. In other embodiments, the DIV system 115 also compares 615 the rules to the available data in the information source database 110. The DIV system 115 compares the rules to detect 620 rules conflicts. The rules conflicts can include, but are not limited to, quality rules conflicts (where the required data is missing or misformatted); content rules conflicts (where the data available is outside of the required bounds); mismatching rules conflicts (where different sets of rules require data to be in different formats); and differing data requirements (where different data is required by different destination systems 125-135). When the DIV system 115 detects 620 a rules conflict, the DIV system 115 determines 625 a potential fix. For example, the DIV system 115 may determine 625 to create two different fields with the same information but in different formats. The DIV system 115 may also determine 625 that a specific piece of data is not provide, but can be derived from the available information. The DIV system 115 stores 630 the potential fix for the rules conflict and returns to Step 615 to compare 615 the sets of rules. The DIV system 115 continues to cycle through Steps 615-630 until all of the rules conflicts are resolved. In some embodiments, the DIV system 115 is unable to determine 625 a potential fix for a rules conflict. In these embodiments, the DIV system 115 logs the rules conflict and requests user input to correct the rules conflict. For example, a required field or piece of information might not be available in the information source database 110. In this example, the user can remove the requirement, ensure that the required data is added to the information source database 110, or instruct that the data is retrieved from a different source than information source database 110.

Once the DIV system 115 detects 620 no more unresolved rules conflicts, the DIV system 115 generates 635 the format for the data message based on the comparison and any potential fixes. In some embodiments, the DIV system 115 generates 635 the format of the data message and the instructions on how to populate the fields of the data message from the information source database 110. The source system 105 would then follow those instructions in populating the data message as shown in Step 515 (shown in FIG. 5). Instructions can include, but are not limited to, which fields to place where in the data message, how to format those fields, and how to generate the data for the fields using available data from the information source database 110.

In some embodiments, the DIV system 115 instructs the information source database 110 to store some information differently, such as in a different format, to allow the source system 105 to quickly and efficiently build 515 the data message.

In some embodiments, the DIV system 115 transmits the data locations of the data fields in the data message to each of the downstream systems 125-135, so that each one knows which fields to extract data from. In some embodiments, the destination systems 125-135 receive a complete mapping of the data message. In other embodiments, the destination systems 125-135 receive the mappings of the data fields that are to be retrieved by the corresponding destination system 125-135.

Figure 7A:
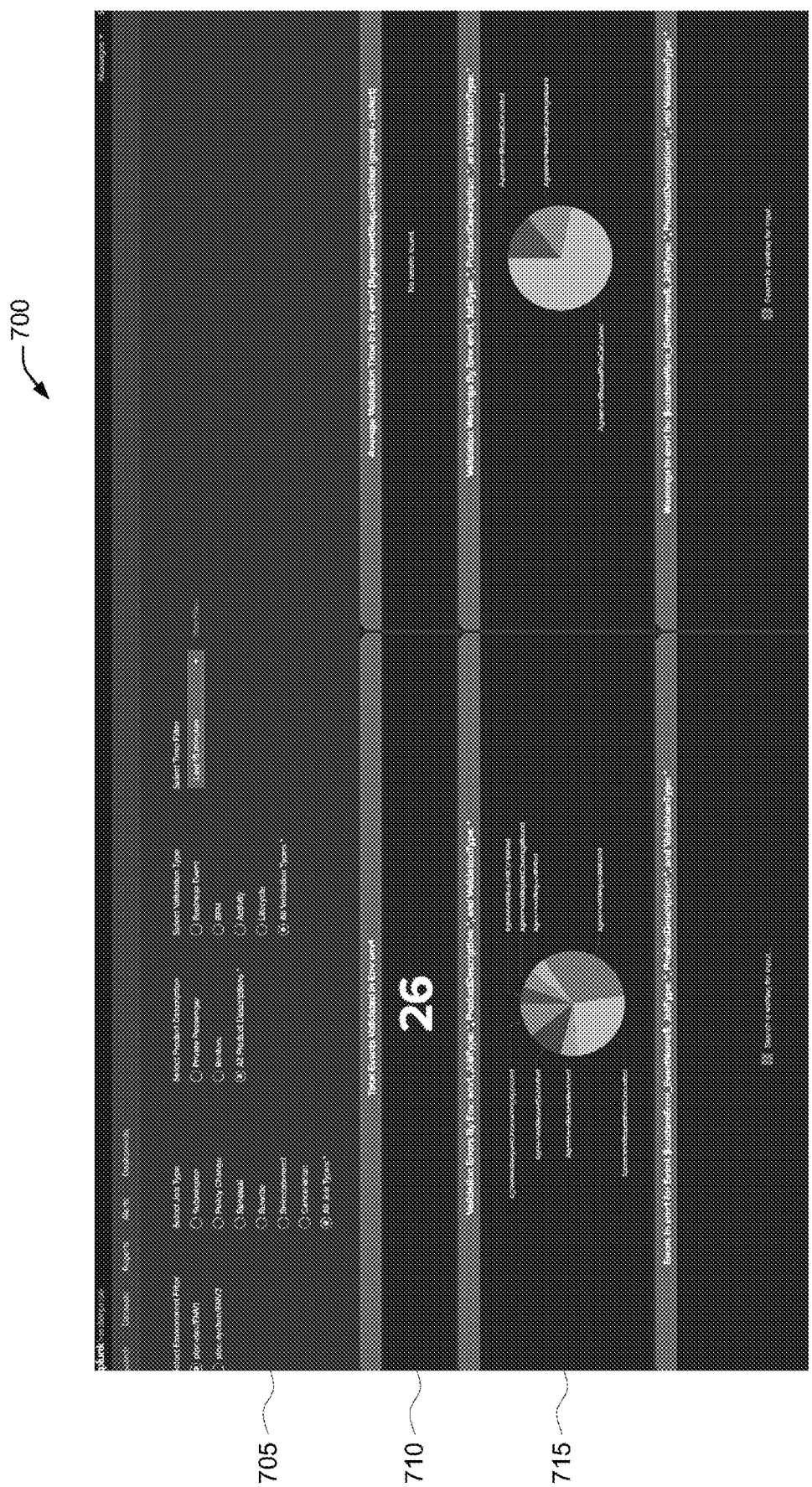
FIGS. 7A and 7B illustrate views of a user interface for viewing the results of a data validation and integrity check in accordance with at least one embodiment.
Figure 7B:
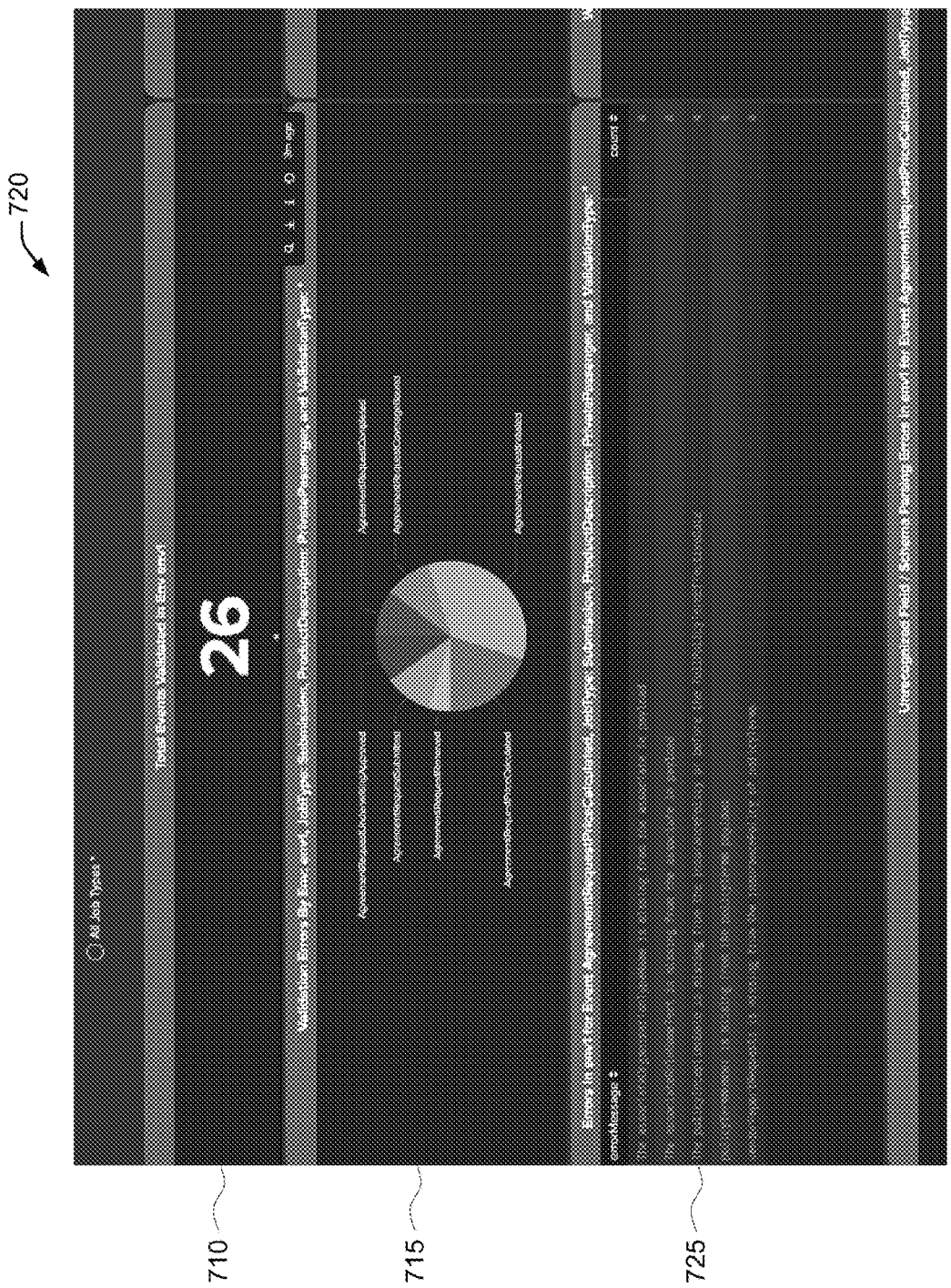

FIGS. 7A and 7B illustrate views 700 and 720 of a user interface for viewing the results of a data validation and integrity check in accordance with at least one embodiment. Views 700 and 720 display a dashboard for quickly and efficiently viewing the results of a data validation and integrity check. The dashboard shown in FIGS. 7A and 7B displays a holistic view of the quality of the data in the data message. The dashboard can display the results of data message validation 525 (shown in FIG. 5) and/or the results of detected rules conflicts 620 (shown in FIG. 6). In view 700, the dashboard includes a plurality of selectable filters 705, which allow the user to choose which information to view. View 700 also includes a numerical display 710 to show the number of validation issues (errors and warnings) that were discovered. View 700 further includes a graphical display 715 to show the validation issues in a pie chart separated by type or other visual presentation. In view 720, one or more of the filters 705 have been selected and the numerical display 710 and the graphical display 715 have been updated based on the selected filters. Furthermore, in view 720, a validation issues display area 725 displaying individual validation issues. In some embodiments, a user can drill down to learn more about the validation issues that have arisen. In some embodiment, the user can select a pie piece from the graphical display 715 and have the validation issues associated with that pie piece displayed in the validation issue display area 725. The user can also select an individual validation issue in the validation issue display area 725 to learn more information about the individual validation issue.

FIG. 8 illustrates a process 800 for performing data validation and integrity checks using at least one of the system 100 (shown in FIG. 1), the system 200 (shown in FIG. 2), and the system 400 (shown in FIG. 4). In the exemplary embodiment, process 800 is performed by the DIV system 115 (shown in FIG. 1).

In the exemplary embodiment, the DIV system 115 stores 805 a plurality of rules for transmitting to a plurality of destination systems 125-135. The plurality of destination systems includes a first destination system, such as destination system A 125, and a second destination system, such as destination system B 130. The data message includes a first plurality of fields for the first destination system 125 and a second plurality of fields for the second destination system 130.

In the exemplary embodiment, the DIV system 115 receives 810, from a requesting system, such as source system 105 (shown in FIG. 1), a data message for transmission to the plurality of destination systems 125-135. The data message is configured to be routed to each of the plurality of destination systems 125-135. The plurality of destination systems includes a first destination system 125 and a second destination system 130. The data message is configured to be routed to the first destination system 125 and then from the first destination system to the second destination system 130.

In the exemplary embodiment, the DIV system 115 compares 815 the data message to the plurality of rules to validate the data message. If the data message is validated, the DIV system 115 instructs 820 the requesting system to transmit the data message to the plurality of destination systems 125-135. The DIV system 115 determines one or more validation errors based on the comparison. The one or more validation errors can include at least one of missing data, incorrect data, improperly formatted data, and failed conditional logic. The DIV system 115 determines whether or not to validate the data message based on the one or more validation errors. The DIV system 115 determines an error level for each validation error of the one or more validation errors. The error level includes at least one of a low level and a high level.

The DIV system 115 validates the data message if none of the one or more validation errors includes a high level. The DIV system 115 indicates that the validation failed if at least one validation error of the one or more validation errors includes a high level. The DIV system 115 requests a user input in response to a validation error including a high level. The DIV system 115 adjusts the data message to correct at least one validation error of the one or more validation errors. The DIV system 115 stores the one or more validation errors for further review.

The data message is assembled by a source system 105 from a source database, such as information source database 110, based on a predetermined data format including a plurality of fields to be populated from the source database 110. The source system 105 retrieves a data value from the source database 110. The source system 105 converts the data value from a first format to a second format. The source system 105 populates a data field of the data message with the converted data value. The source system 105 retrieves a data value from the source database 110. The source system 105 populates a first data field of the data message with the data value. The first data field is associated with a first destination system, such as destination system A 125 of the plurality of destination systems 125-135. The source system 105 converts the data value from a first format to a second format. The source system 105 populates a second data field of the data message with the converted data value. The second data field is associated with a second destination system, such as destination system B 130, of the plurality of destination systems 125-135.

The plurality of destination systems 125-135 includes a first destination system 125 and a second destination system 130. The DIV system 115 receives a first plurality of rules from the first destination system 125. The DIV system 115 receives a second plurality of rules from the second destination system 130. The DIV system 115 compares the first plurality of rules to the second plurality of rules. The DIV system 115 generates the plurality of rules based on the comparison. The DIV system 115 detects a first conflict between the first plurality of rules and the second plurality of rules associated with a first data field. The DIV system 115 generates a format for the data message to include a first version of a first data field for the first destination system 125 and a second version of the first data field for the second destination system 130.

Figure 9:
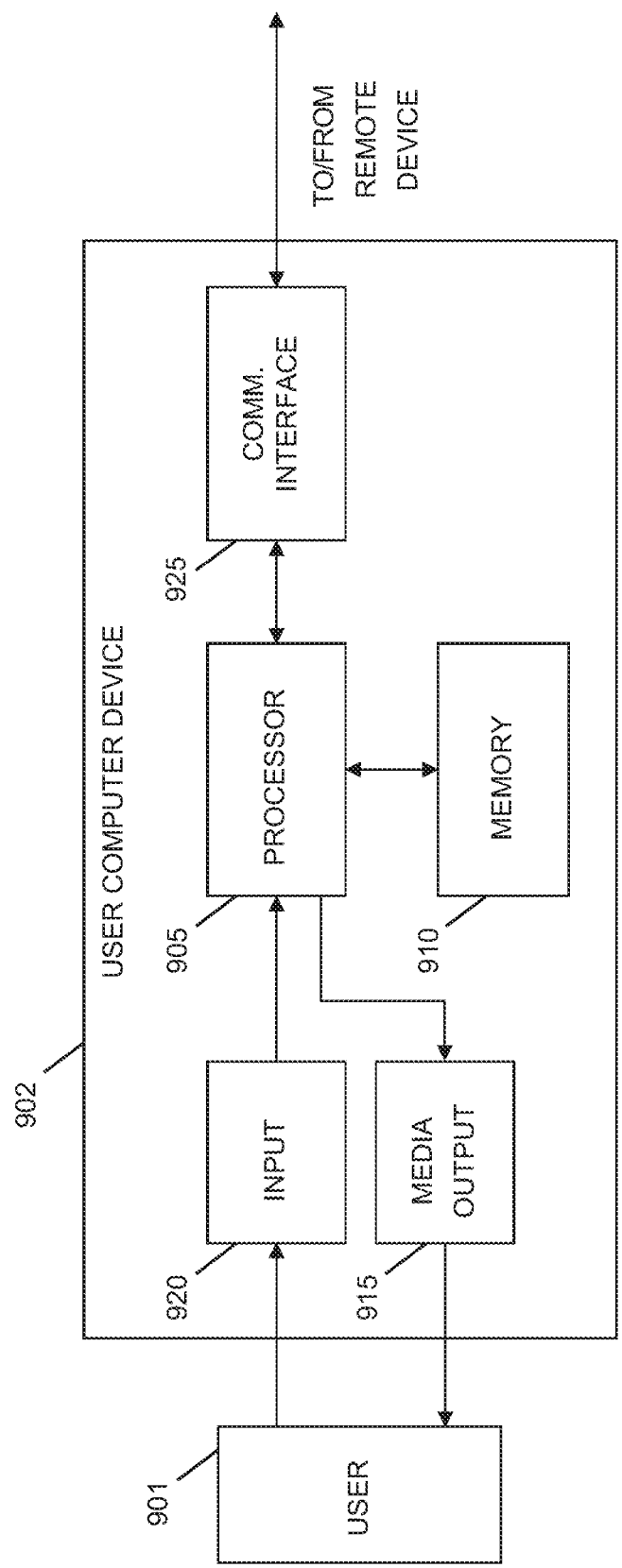
FIG. 9 illustrates an example configuration of user computer device used in the system shown in FIG. 1, in accordance with one example of the present disclosure.

FIG. 9 illustrates an example configuration of user computer device 902 used in the system 100 (shown in FIG. 4), in accordance with one example of the present disclosure. User computer device 902 is operated by a user 901. The user computer device 902 can include, but is not limited to, the source system 105 and the destination systems 125-135 (shown in FIG. 1). The user computer device 902 includes a processor 905 for executing instructions. In some examples, executable instructions are stored in a memory area 910. The processor 905 can include one or more processing units (e.g., in a multi-core configuration). The memory area 910 is any device allowing information such as executable instructions and/or transaction data to be stored and retrieved. The memory area 910 can include one or more computer-readable media.

The user computer device 902 also includes at least one media output component 915 for presenting information to the user 901. The media output component 915 is any component capable of conveying information to the user 901. In some examples, the media output component 915 includes an output adapter (not shown) such as a video adapter and/or an audio adapter. An output adapter is operatively coupled to the processor 905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 915 is configured to present a graphical user interface (e.g., a web browser and/or a client application) to the user 901. A graphical user interface can include, for example, an interface for viewing validation errors. In some examples, the user computer device 902 includes an input device 920 for receiving input from the user 901. The user 901 can use the input device 920 to, without limitation; select a validation error to view. The input device 920 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 915 and the input device 920.

The user computer device 902 can also include a communication interface 925, communicatively coupled to a remote device such as the DIV system 115 (shown in FIG. 1), one or more destination systems 125-135, and the source system 105. The communication interface 925 can include, for example, a wired or wireless network adapter and/or a wireless data transceiver for use with a mobile telecommunications network.

Stored in the memory area 910 are, for example, computer-readable instructions for providing a user interface to the user 901 via the media output component 915 and, optionally, receiving and processing input from the input device 920. A user interface can include, among other possibilities, a web browser and/or a client application. Web browsers enable users, such as the user 901, to display and interact with media and other information typically embedded on a web page or a website from the source system 105 or the DIV system 115. A client application allows the user 901 to interact with, for example, the DIV system 115. For example, instructions can be stored by a cloud service, and the output of the execution of the instructions sent to the media output component 915.

The processor 905 executes computer-executable instructions for implementing aspects of the disclosure.

Figure 10:
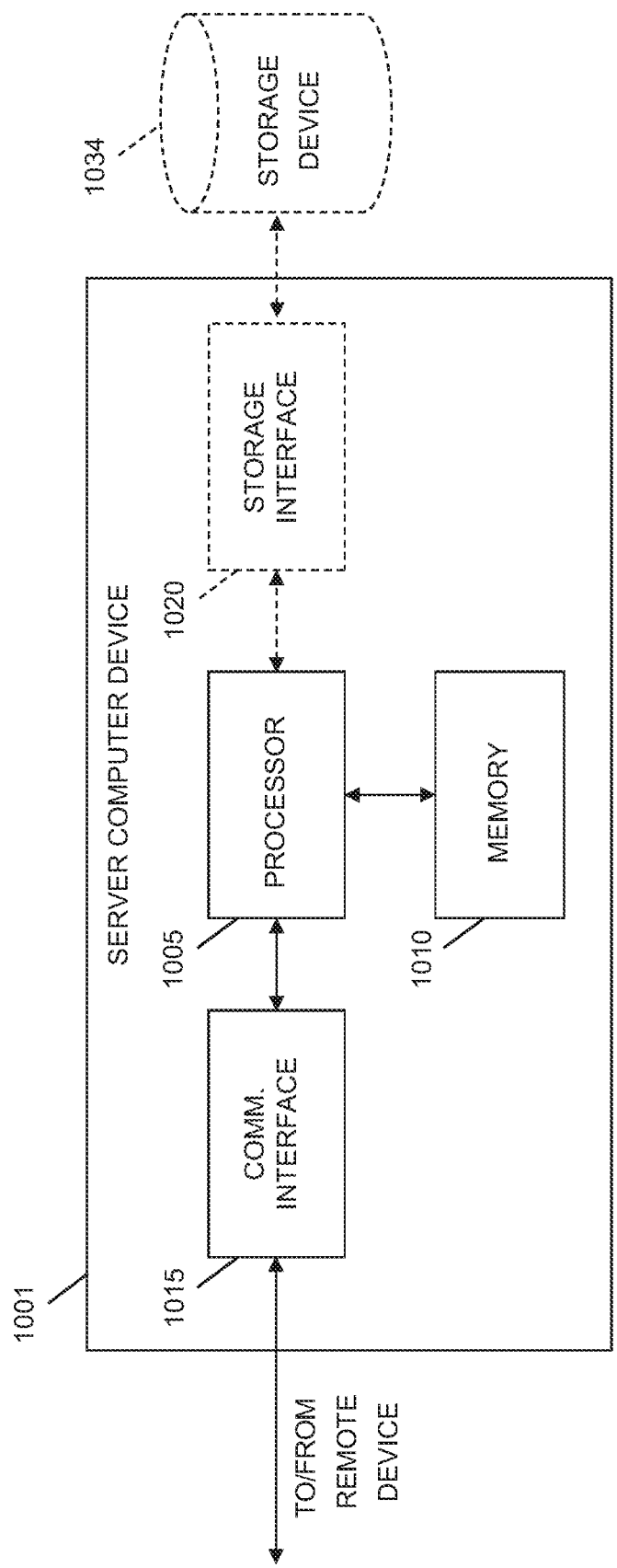
FIG. 10 illustrates an example configuration of a server computer device used in the system shown in FIG. 1, in accordance with one example of the present disclosure.

FIG. 10 illustrates an example configuration of a server computer device 1001 used in the system 100 (shown in FIG. 1), in accordance with one example of the present disclosure. Server computer device 1001 can include, but is not limited to, the source system 105, the DIV system 115, and the destination systems 125-135 (shown in FIG. 1). The server computer device 1001 also includes a processor 1005 for executing instructions. Instructions can be stored in a memory area 1010. The processor 1005 can include one or more processing units (e.g., in a multi-core configuration).

The processor 1005 is operatively coupled to a communication interface 1015 such that the server computer device 1001 is capable of communicating with a remote device such as another server computer device 1001, the source system 105, the DIV system 115, and the destination systems 125-135. For example, the communication interface 1015 can transmit data messages to the destination systems 125-135 via the Internet, as illustrated in FIG. 1.

The processor 1005 can also be operatively coupled to a storage device 1034. The storage device 1034 is any computer-operated hardware suitable for storing and/or retrieving data, such as, but not limited to, data associated with the information source database 110 and the rules database (both shown in FIG. 1). In some examples, the storage device 1034 is integrated in the server computer device 1001. For example, the server computer device 1001 can include one or more hard disk drives as the storage device 1034. In other examples, the storage device 1034 is external to the server computer device 1001 and can be accessed by a plurality of server computer devices 1001. For example, the storage device 1034 can include a storage area network (SAN), a network attached storage (NAS) system, and/or multiple storage units such as hard disks and/or solid state disks in a redundant array of inexpensive disks (RAID) configuration.

In some examples, the processor 1005 is operatively coupled to the storage device 1034 via a storage interface 1020. The storage interface 1020 is any component capable of providing the processor 1005 with access to the storage device 1034. The storage interface 1020 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1005 with access to the storage device 1034.

The processor 1005 executes computer-executable instructions for implementing aspects of the disclosure. In some examples, the processor 1005 is transformed into a special purpose microprocessor by executing computer-executable instructions or by otherwise being programmed. For example, the processor 1005 is programmed with instructions such as those shown in FIGS. 5, 6, and 8.

Described herein are computer systems such as the data integrity and validation computer devices and related computer systems. As described herein, all such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" can refer to either a body of data, a relational database management system (RDBMS), or to both. As used herein, a database can include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present examples can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The systems and processes are not limited to the specific examples described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system for performing enhanced rules conflict checking, the computer system including at least one processor in communication with at least one memory device, wherein the at least one processor is programmed to:
   store a plurality of rules for transmitting to a plurality of destination systems, including a first destination system and a second destination system;
   receive, from a requesting system, a data message for transmission to the plurality of destination systems, wherein the data message is configured to be routed to each of the plurality of destination systems including the first destination system and the second destination system;
   compare the data message to one or more rules of the plurality of rules associated with the first destination system to validate the data message for the first destination system;
   compare the data message to one or more additional rules of a first plurality of rules associated with the second destination system to validate the data message for the second destination system, wherein the one or more rules and the one or more additional rules are different; and
   if the data message is validated for both the first destination system and the second destination system, instruct the requesting system to transmit the data message to the first destination system,
   wherein the at least one processor is programmed to validate the data message for both the first destination system and the second destination system by determining that no high level validation errors exist when comparing the data message to the one or more rules and to the one or more additional rules.

2. The computer system in accordance with claim 1, wherein the data message is configured to be transmitted to the first destination system and then subsequently transmitted from the first destination system to the second destination system by the first destination system.

3. The computer system in accordance with claim 1, wherein the data message includes a plurality of data fields, wherein a first data field of the plurality of data fields is validated for the first destination system, and wherein a second data field of the plurality of data fields is validated for the second destination system, and where the first data field and the second data field are different.

4. The computer system in accordance with claim 3, wherein the first destination system retrieves the first data field and transmits the data message to the second destination system and the second destination system retrieves the second data field and transmits the data message to one or more remaining destination system of the plurality of destination systems.

5. The computer system in accordance with claim 1, wherein the at least one processor is further programmed to:
   determine one or more validation errors based on the comparisons; and
   determine not to validate the data message if the one or more validation errors includes a high level validation error.

6. The computer system in accordance with claim 5, wherein the at least one processor is further programmed to adjust the data message to correct at least one validation error of the one or more validation errors.

7. The computer system in accordance with claim 5, wherein the at least one processor is further programmed to store the one or more validation errors for further review.

8. The computer system in accordance with claim 5, wherein the one or more validation errors include at least one of missing data, incorrect data, improperly formatted data, and failed conditional logic.

9. The computer system in accordance with claim 5, wherein the at least one processor is further programmed to:
   determine an error level for each validation error of the one or more validation errors, wherein the error level includes at least one of a low level error and a high level error; and
   validate the data message if the one or more validation errors only include low level errors.

10. The computer system in accordance with claim 9, wherein the at least one processor is further programmed to indicate that the validation failed if at least one validation error of the one or more validation errors includes a high level error.

11. The computer system in accordance with claim 1, wherein the at least one processor is further programmed to request a user input in response to a validation error including a high level error.

12. The computer system in accordance with claim 1, wherein the data message is configured to be routed to the first destination system and then from the first destination system to the second destination system.

13. The computer system in accordance with claim 12, wherein the data message includes a first plurality of fields for the first destination system and a second plurality of fields for the second destination system.

14. The computer system in accordance with claim 1, wherein the data message is assembled by a source system from a source database based on a predetermined data format including a plurality of fields to be populated from the source database.

15. The computer system in accordance with claim 14, wherein the source system is programed to:
   retrieve a data value from the source database;
   convert the data value from a first format to a second format; and
   populate a data field of the data message with the converted data value.

16. The computer system in accordance with claim 14, wherein the source system is programmed to:
   retrieve a data value from the source database;
   populate a first data field of the data message with the data value, wherein the first data field is associated with the first destination system of the plurality of destination systems;
   convert the data value from a first format to a second format; and
   populate a second data field of the data message with the converted data value, wherein the second data field is associated with the second destination system of the plurality of destination systems.

17. The computer system in accordance with claim 1, wherein the at least one processor is further programmed to:
   receive a first plurality of rules from the first destination system;
   receive a second plurality of rules from the second destination system;
   compare the first plurality of rules to the second plurality of rules; and
   generate the plurality of rules based on the comparison.

18. The computer system in accordance with claim 17, wherein the at least one processor is further programmed to detect a first conflict between the first plurality of rules and the second plurality of rules associated with a first data field.

19. The computer system in accordance with claim 17, wherein the at least one processor is further programmed to generate a format for the data message to include a first version of a first data field for the first destination system and a second version of the first data field for the second destination system.

20. A method for performing enhanced rules conflict checking, the method performed by a computer system including at least one processor in communication with at least one memory device, wherein the method includes:
   storing, in the at least one memory device, a plurality of rules for transmitting to a plurality of destination systems, including a first destination system and a second destination system;
   receiving, from a requesting system, a data message for transmission to the plurality of destination systems, wherein the data message is configured to be routed to each of the plurality of destination systems including the first destination system and the second destination system;
   comparing the data message to one or more rules of the plurality of rules associated with the first destination system to validate the data message for the first destination system;
   comparing the data message to one or more additional rules of a first plurality of rules associated with the second destination system to validate the data message for the second destination system, wherein the one or more rules and the one or more additional rules are different; and
   in response to the data message being validated for both the first destination system and the second destination system, instructing the requesting system to transmit the data message to the first destination system,
   wherein the at least one processor is programmed to validate the data message for both the first destination system and the second destination system by determining that no high level validation errors exist when comparing the data message to the one or more rules and to the one or more additional rules.

* * * * *